United States Patent [19]

Baars

[11] Patent Number: 4,785,857

[45] Date of Patent: Nov. 22, 1988

[54] METHOD AND AN APPARATUS FOR FITTING A STOPPER IN A PIPE, TUBE, WALL PASSAGE OR THE LIKE, AND A CONTAINER CONSISTING OF AT LEAST TWO COMPARTMENTS FILLED WITH INTERMIXABLE SUBSTANCES

[75] Inventor: Jan Baars, Montfoort, Netherlands

[73] Assignee: Chemische Industrie Filoform B.V., Netherlands

[21] Appl. No.: 21,123

[22] Filed: Mar. 3, 1987

[30] Foreign Application Priority Data

Mar. 10, 1986 [NL] Netherlands ......................... 8600619
Mar. 18, 1986 [NL] Netherlands ......................... 8600689

[51] Int. Cl.⁴ ............................................. F16L 55/12
[52] U.S. Cl. ........................................ 141/9; 138/89; 206/222
[58] Field of Search .................. 138/89, 90, 92, 93, 138/97; 206/219, 222; 141/9

[56] References Cited

U.S. PATENT DOCUMENTS

| | | | |
|---|---|---|---|
| 3,295,724 | 1/1967 | Brooks et al. ................... | 206/222 X |
| 3,340,336 | 9/1967 | Bender ............................. | 138/89 X |
| 3,690,348 | 9/1972 | Patterson ......................... | 138/93 X |
| 3,870,085 | 3/1975 | Schneider ........................ | 138/93 |
| 4,160,465 | 7/1979 | Hsu ................................... | 138/89 X |
| 4,607,469 | 8/1986 | Harrison .......................... | 138/89 X |
| 4,660,603 | 4/1987 | Tash ................................. | 138/93 X |

FOREIGN PATENT DOCUMENTS 2157390 4/1984 United Kingdom ................. 138/93

Primary Examiner—Mark J. Thronson
Attorney, Agent, or Firm—Griffin, Branigan & Butler

[57] ABSTRACT

The invention relates to a method of stoppering a pipe, or the like. The method uses a two-compartment flexible container, with one compartment containing an activating agent, and the other a foamable resin. After mixing a nipple is attached to a container wall. The nipple, on one end, has rupturing elements to rupture the wall and the other end is connected to a supply hose whose free end is brought to the desired location in the pipe for stoppering the same with foamed resin flowing from the container.

8 Claims, 2 Drawing Sheets

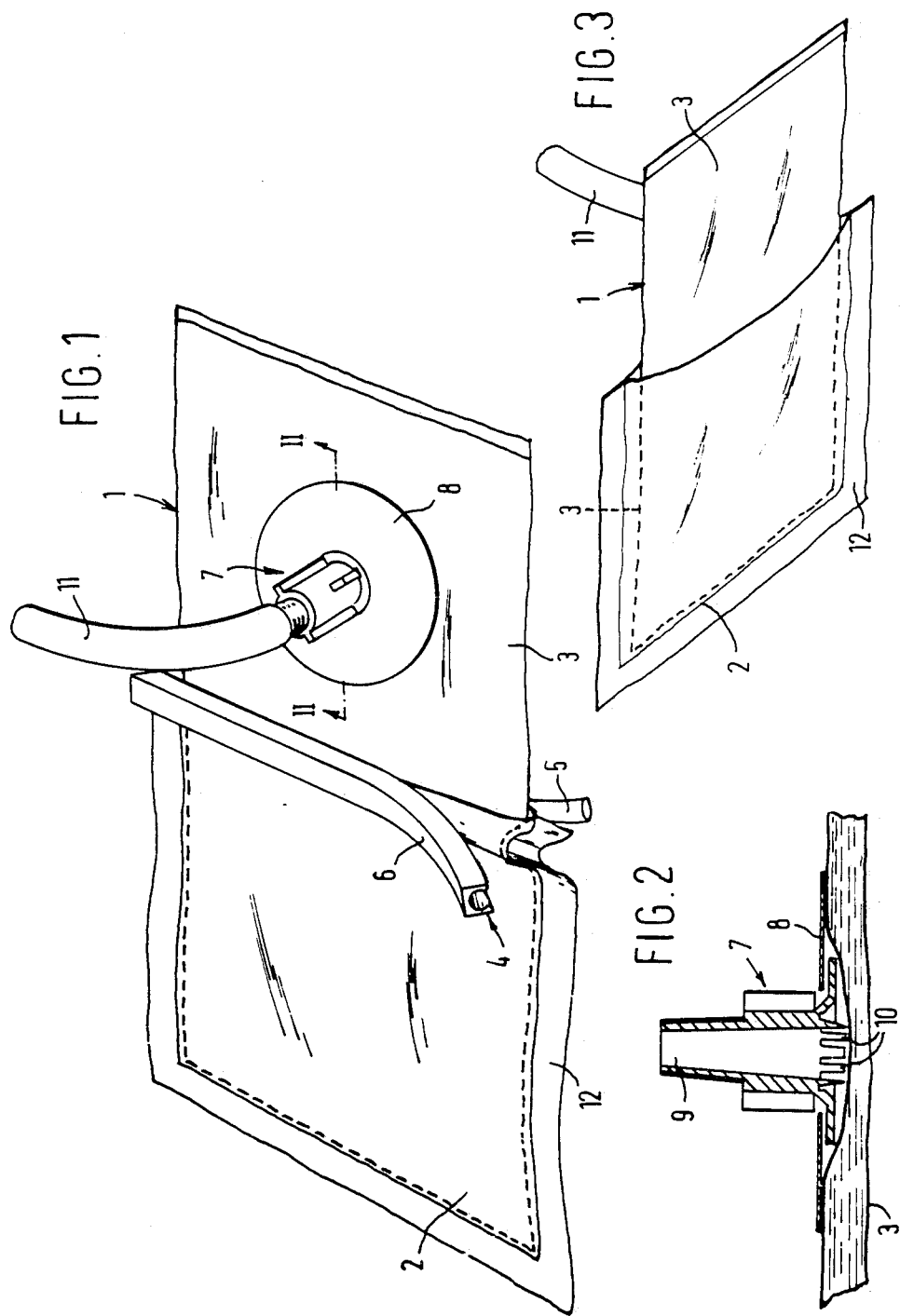

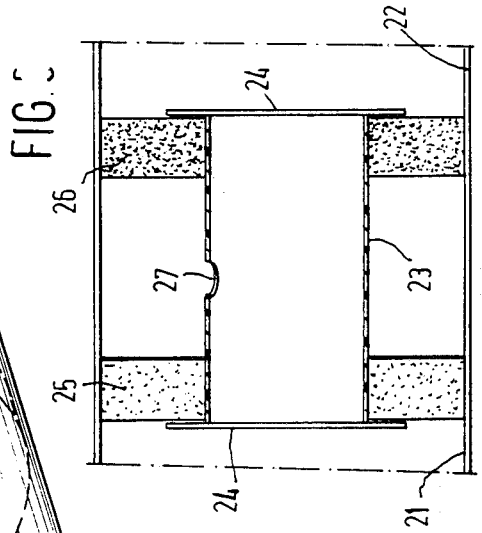
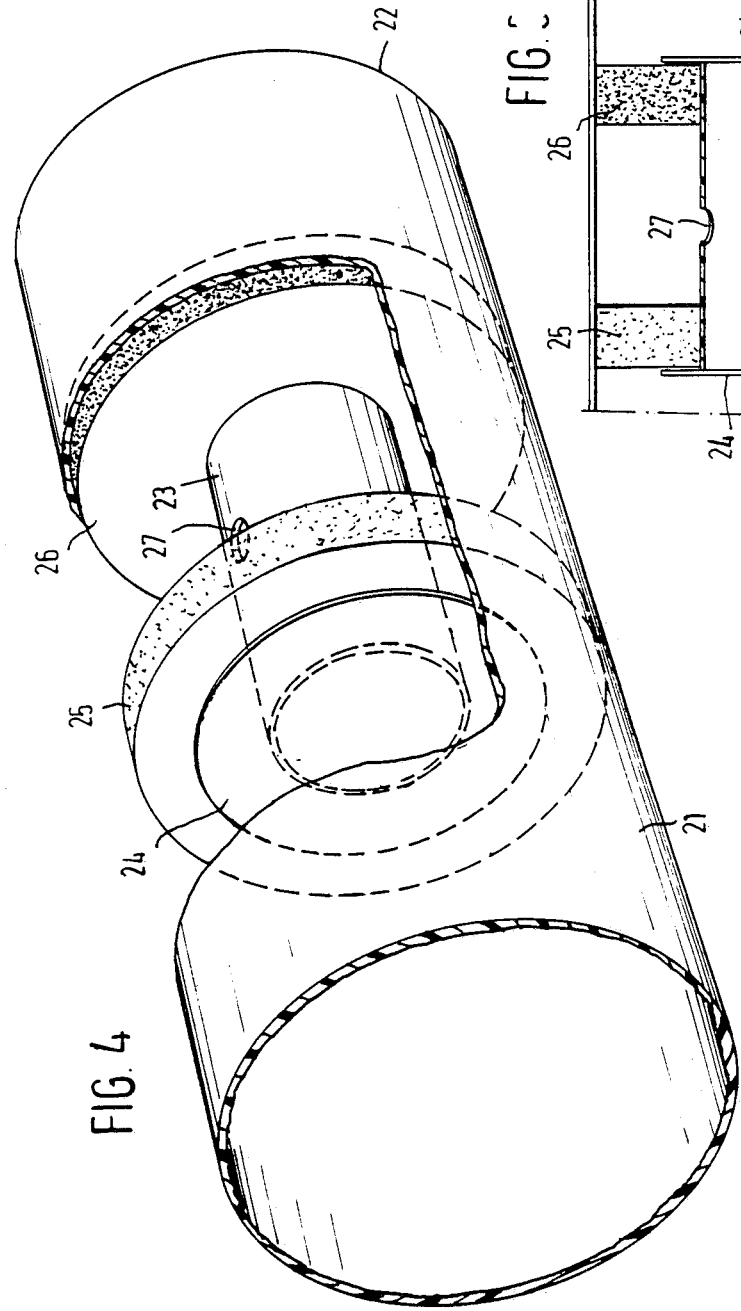

METHOD AND AN APPARATUS FOR FITTING A STOPPER IN A PIPE, TUBE, WALL PASSAGE OR THE LIKE, AND A CONTAINER CONSISTING OF AT LEAST TWO COMPARTMENTS FILLED WITH INTERMIXABLE SUBSTANCES

This invention relates to a method of fitting a stopper in a pipe, tube, wall passage or the like, in particular when also one of more tubes, conductors or the like extend through said pipe, tube, wall passage or the like. A problem connected with the fitting of such stoppers is that when a foamable liquid is applied at the location concerned, this liquid will flow away, so that no closure is ensured. Mainly when conductors or leads extend through the opening to be closed, also the use of sealing plugs will give problems; on the one hand due to the constantly different diameter of the opening to be closed, and on the other hand due to the constantly different diameters of the lead(s) or conductor(s) extending through the opening.

It is an object of the present invention to remove this problem.

To this effect, the method is characterized by using a two-compartment container, said compartments being closed relatively to each other by a detachable connection, one compartment containing a hardening agent, the other a resin, while after mixing the hardening agent and the resin, there is fitted a nipple on one of the container walls whose wall-facing end around its passage is provided at least partly with rupturing elements, while the other end of the nipple is connected or connectible to a supply hose whose free end is brought to a desired location in the pipe, tube or wall passage. Said container can subsequently be received in an enclosed space having a passage for the supply hose. Said hose preferably has a length that depends on the resin and hardening agent employed.

Another possibility is that use is made of a tubular element having a diameter smaller than that of the pipe, tube or the like to be closed, the closed ends of which are provided with an outwardly extending flange, while before installing the said assembly in the pipe or tube to be closed, a foamable liquid is introduced via an opening in said tubular portion.

In the method using a compartmented container, after the synthetic resin and the hardening agent have been mixed and confinement in an enclosed space, the mixture will foam up so that the wall will tear at the location of the rupturing elements of the nipple. As a result, the partly foamed, meanwhile jelly- or cream-like liquid will flow via the supply hose to the desired location where it will form a dam while continuing to foam and thus will not flow away due to such foaming.

By arranging the container i.e. the mixture of synthetic resin and hardening agent, in an enclosed space, it is ensured that the foaming liquid is discharged through the hose, thus also ensuring that said container does not crack in a random space so that it empties itself. The enclosed space may be either a stationary, enclosed space, i.e. e.g. consisting of two mutually lockable box portions having a supply hose passage, or take the form of a pump: the latter has the advantage that all of the foam can be discharged from the container through the supply hose. When use is made of an enclosed space and a hose connected thereto, the latter can be retracted after the liquid has expanded substantially completely, after which the space formed by removal of the hose will be filled by the continued foaming or after-foaming of the mixture. Another possibility is to maintain the hose in the stopper installed and to sever it in the correct place.

When use is made of a tubular element having a diameter smaller than that of the pipe, tube or the like to be closed, the closed ends of which are provided with an outwardly extending flange, with foamable liquid being introduced through an opening in the tubular portion before fitting the tubular element in the pipe or tube to be closed, it is possible to limit the quantity of foam "leaking away" by fitting an elastic disc at the facing ends of the flanges.

By making, in the last-mentioned case, the synthetic plastics disc at the outwardly directed side less elastic than that at the non-visible side of the closure or stopper to be made, it can be ensured that any leakage liquid or foam will flow away towards the non-visible side of the stopper.

An advantage of this method is that the foam within the tube, after solidification or closure of the passage, will expand further due to after-foaming, so that the cylindrical portion of the tube will bulge and an additional guarantee for sealing is obtained.

The present invention further relates to an apparatus for performing the above method, comprising a tubular element having a tubular portion whose two ends are closed by outwardly extending flanges, a passage being provided in the body of said tubular portion, while at the facing ends of the flanges, an elastic disc is provided thereagainst. Said disc may consist of polyester, polyurethane or similar elastic, open-celled foam material; however, it is also possible to use a rubber disc whose outer edge is flexible.

By manufacturing the tubular element of transparent, synthetic plastics material, its degree of filling can be easily checked.

As an example of a foamable liquid can be mentioned polyurethane.

In addition to the above described method and apparatus, it is also possible to employ an apparatus of the aforementioned type whose tubular portion is not provided with a passage, but wherein a hose can be introduced through one of the elastic discs as the apparatus is being introduced into the opening to be closed, said hose extending to between the two elastic discs and via which, after positioning the apparatus, a foamable liquid can be supplied.

The present invention further relates to a flexible container consisting at least of two compartments, suitable for application in the above described method, said compartments being closed relatively to each other by a detachable connection, with the various compartments containing intermixable substances curable immediately after mixing. Said container is characterized in that around one or more compartments there is provided a covering foil fixed relatively to the compartments concerned and consisting of air-impermeable material, such as Al foil. Said covering foil may be fixed by the detachable connection closing the compartments relatively to each other.

Another possibility is that the covering foil is integral with the walls of the flexible container.

Some embodiments of an apparatus for fitting a stopper in a pipe or tube, a wall passage or the like according to the present invention will now be describe, by way of example, with reference to the accompanying drawings, in which:

FIG. 1 is a perspective view of the means for performing the method;

FIG. 2 is a cross-sectional view taken on the line II—II of FIG. 1;

FIG. 3 is a perspective, reduced view of the apparatus of FIG. 1 from the bottom after removal of the locking device;

FIG. 4 is a perspective view, with some parts being partly removed, of an apparatus for fitting a stopper in a pipe; and FIG. 5 is a cross-sectional view of said apparatus mounted in a pipe section.

As shown in FIGS. 1–3, for fitting a stopper in a tube use is made of a container 1 having two compartments 2, 3 closed relatively to one another by a detachable locking device 4, consisting of a pin or hose 5 around which the parts to be closed relatively to each other are wound, after which a clamping rod 6 is fitted around the pin, together with the parts to be closed. Such a construction is known per se.

The kit further includes a nipple 7 adapted to be fitted on one of the walls of container 1 by means of an adhesive ring 8 (both known per se), after the mixing of the substances contained therein. As shown in the cross-sectional view of FIG. 2, the underside of the nipple has a plurality of edges 10 extending partly around a passage 9 of the nipple, which edges will cut through the wall of the container when the mixture contained therein starts to foam. The free end of the nipple further connects to a supply or filling hose 11 through which the foaming material can be supplied to the desired location.

The length of the hose depends on the synthetic resin and hardening agent employed. As an example of a suitable foam plastic can be mentioned polyurethane.

The kit further includes a pump, not shown, having a space for receiving container 1 and a passage for nipple 7 or hose 11.

As appears in particular from the view shown in FIG. 3, the one compartment, i.e. 2, containing isocyanate, is provided with a bag-shaped aluminum foil 12 which, as shown in FIG. 1, is connected to the container by means of locking device 4 consisting of pin 5 and clamping rod 6. The fitting of the aluminum foil prevents migration of atmospheric oxygen to the isocyanate.

As shown in FIGS. 4 and 5, a pipe section 21 spaced some distance from the end 22 accommodates a tubular element 23 having a diameter smaller than that of tube section 21. Tubular member 23, as appears more in particular from FIG. 5, is closed on both ends by a disc-shaped flange 24 extending to beyond the tubular member 23, thus forming a collar against which a synthetic plastics disc 25, 26 can be supported. Discs 25, 26 are made of synthetic plastics material having an open-celled structure. Disc 26 is made of less elastic material than disc 25. The reason of this will be elucidated hereinafter.

Provided in tubular member 23 is an opening 27 serving on the one hand for introducing liquid synthetic plastics material into the tubular member 23 and on the other hand for passing said liquid material during its foaming into the annular space defined by the outer wall of the tubular member, the inner wall of the pipe section 21 and the two elastic plastics discs 25, 26. The diameter of opening 27 depends on the degree of polymerization and foaming of the foamed synthetic plastics material in the enveloping space. By making the elastic plastics disc 26 more rigid than the elastic plastics disc 25, it is achieved that any foaming synthetic resin leaking along the plastics disc 25 will leak towards the inner end of pipe section 21 and not along the outwardly oriented, more rigid plastics disc 26.

By making the tubular element 23 with flanges 24 of transparent synthetic material, the degree of filling thereof can be checked easily.

The omission of the elastic plastics discs 25, 26 basically is no impediment for obtaining the desired seal. A a result of the foam plastic leaking away, this requires more material, however, to ensure a good seal.

As an example of the foamable synthetic plastic material can be mentioned polyurethane. An advantage thereof is that the polyurethane foam in the tubular member 23, after solidification as a result of after-foaming, will expand still further, resulting in bulging of the tubular member 23, so that a further guarantee for a good seal is obtained.

Finally, it is pointed out that as material for the elastic plastics disc can be used polyester, polyurethane or a similar open-celled foam, while also the use of a rubber disc having a flexible outer edge is possible.

What I claim is:

1. A method of foaming in place a stopper directly in an aperture, including a pipe, wall passage or the like, comprising:
    (1) providing a two-compartment flexible wall container with the two compartments being closed relative to each other by a detachable closing element, and wherein one compartment contains a foamable resin and the other contains an activator agent for the foamable resin;
    (2) providing a nipple, which is attachable on a wall of the container, said nipple having a passage therethrough and having at least partially disposed around the said passage rupturing elements which are capable of rupturing a wall of said container;
    (3) providing a supply hose connected to said nipple at the end thereon opposite to the end thereof having the said rupturable elements;
    (4) removing the detachable closing element to provide communication between the said two compartments;
    (5) mixing the said resin with the said activator agent;
    (6) attaching the said nipple to a wall of the container and rupturing the wall of the container where the nipple is attached, whereby a passageway is provided from within the container, through the passage in the nipple and through the said hose; and
    (7) applying pressure to the flexible container to cause the mixed resin and activator agent to flow from the container, through the nipple, through the hose, out of the hose and into the aperture so that a foamed in place stopper in the aperture is provided.

2. A method according to claim 1, wherein the container is disposed in an enclosed space having a passage for the supply hose.

3. A method according to claim 1, wherein the supply hose has a length depending on the resin and activator agent employed.

4. A method according to claim 1, wherein the enclosed space is fixed and comprises two box portions lockable relatively to one another and having a supply hose passage.

5. A method according to claim 2, wherein the enclosed space is formed by a pump cavity having a supply hose passage.

6. A method of foaming in place a stopper directly in an aperture including a pipe, wall passage or the like, comprising:
- (1) providing a tubular member having a tubular wall with the wall having a radially directed filling opening therein;
- (2) providing outwardly extending flanged ends for said tubular member;
- (3) placing the tubular member with the said flanged ends into the aperture to be stoppered;
- (4) flowing a liquid mix of a foamable resin and an activator therefor through the said opening and into the said tubular member, either before or after placing the tubular member in the said aperture; and
- (5) allowing the said resin to foam and fill the space in the tubular member and the space between the tubular member and the said aperture so that a foamed in place stopper in the aperture is provided.

7. A method according to claim 6, wherein the flanges have facing ends and each of the facing ends of the flanges have an elastic disc thereon.

8. A method according to claim 7, wherein the elastic disc on the flange disposed toward the outwardly end of the aperture is made of a material less elastic than the elastic disc on the flange disposed toward the inwardly end of the aperture.

* * * * *